April 3, 1956 W. H. T. HOLDEN 2,740,583
RESOLVING AND INTEGRATING ARRANGEMENT
Filed Aug. 31, 1950 2 Sheets-Sheet 1
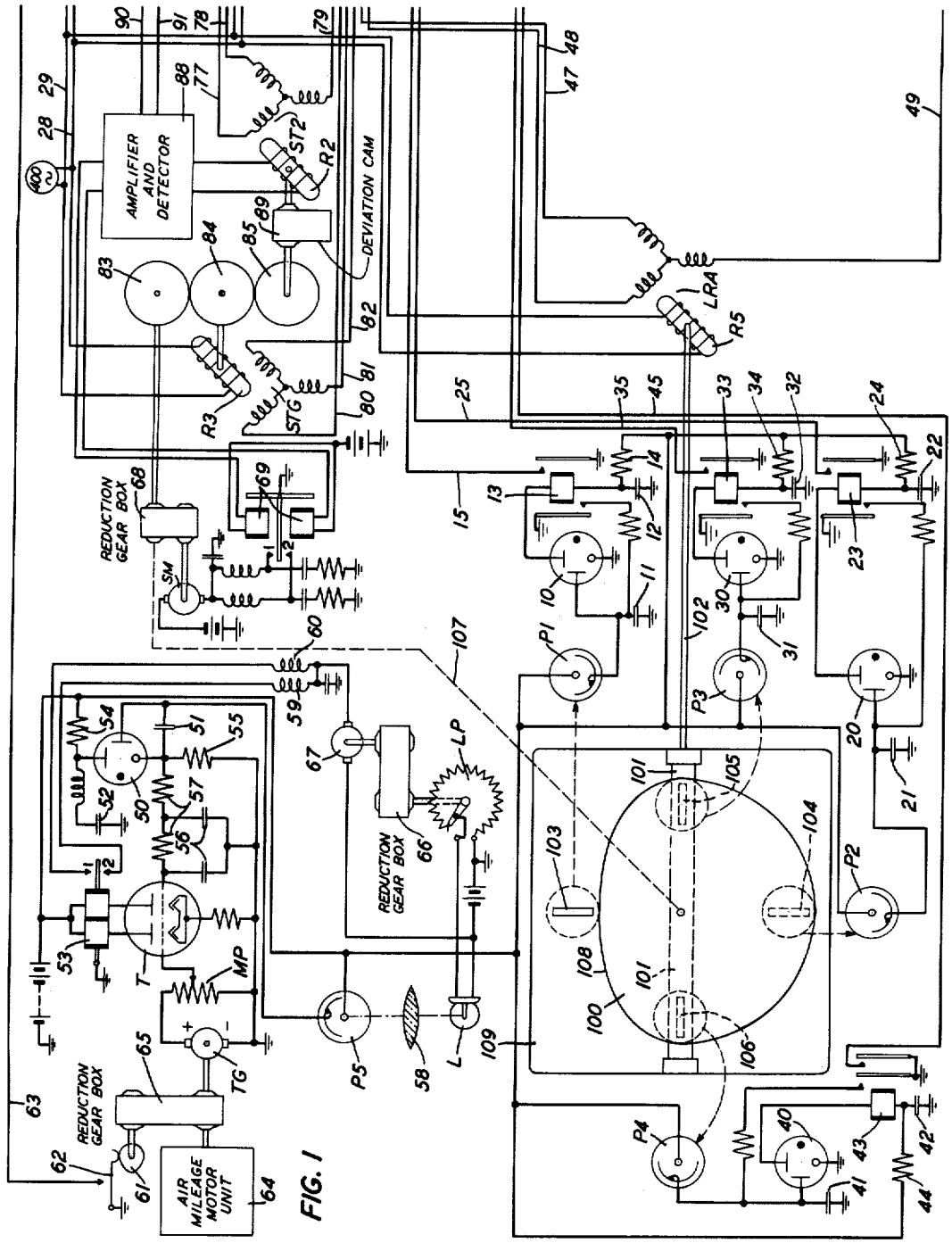
INVENTOR
W. H. T. HOLDEN
BY
J. W. Schmidt
ATTORNEY

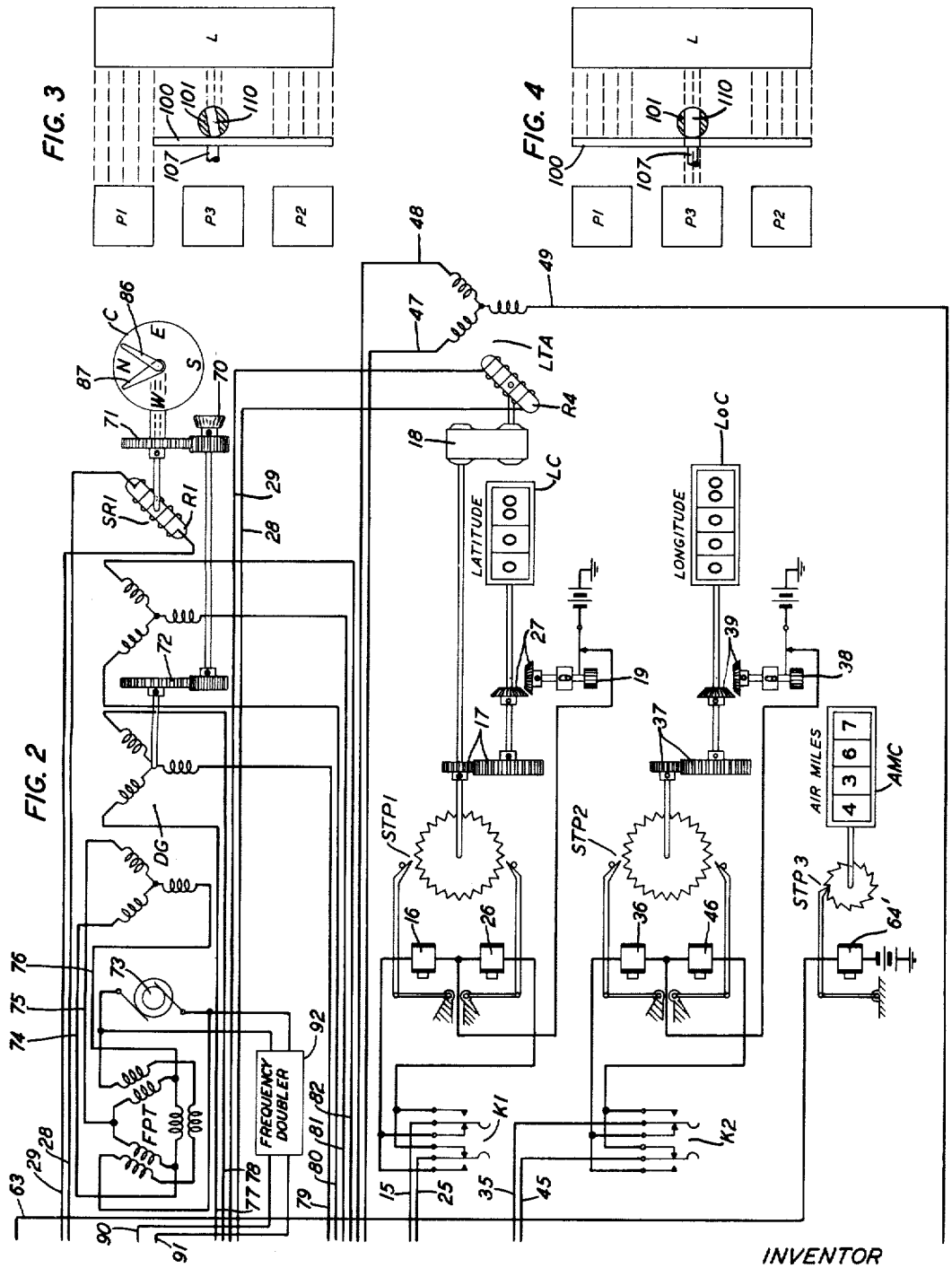

United States Patent Office 2,740,583
Patented Apr. 3, 1956

2,740,583
RESOLVING AND INTEGRATING ARRANGEMENT

William H. T. Holden, Woodside, N. Y., assignor to Bell Telephone Laboratories, Incorporated, New York, N. Y., a corporation of New York Application August 31, 1950, Serial No. 182,467

21 Claims. (Cl. 235—61)

This invention relates generally to means for resolving a plurality of variables and more particularly to means for integrating a plurality of variable functions into a product of a group of said functions.

The invention contemplates a beam of energy and means for modulating or varying said beam of energy in accordance with a plurality of variable functions whereby said modulated or varied beam of energy comprises an integration or product of said functions.

The invention comprises in particular a beam of energy, means for varying the intensity of said beam of energy in accordance with a variable function, means for modulating said beam of energy in accordance with one or more other variable functions, and means responsive to said modified beam of energy in accordance with the product of said functions.

The object of the present invention is the improvement and simplification of such resolving or integrating means.

As disclosed herein, by way of example, the invention is embodied in an arrangement of electrical and mechanical elements whereby an aircraft is provided with dead reckoning indicators of air position in flight. Dead reckoning of air position in flight comprises the ascertainment of the instant latitude and instant longitude of the flight. Assuming for the purpose of simplicity that no corrections are necessary due to winds affecting the flight path, the instant latitude and instant longitude of the flight path may be derived from air speed and compass bearing of the flight path. According to the present embodiment of the invention it is further assumed that alterations in altitude of the flight path have negligible effect upon the dead reckoning computations, which assumption is, of course, a true and fair one since, upon a flight of a hundred miles or so, if an aircraft remains within five or six miles or so of the earth's surface, then changes of altitude will affect the dead reckoning to a very small extent. Actually the final results will be accurate for most practical purposes for any flight except perhaps that of a highly maneuverable fighter aircraft which is constantly climbing and diving during tactical flight. In this case, some correction might be desirable to take into account the error introduced into dead reckoning by virtue of the relatively large expenditure of air speed in the vertical direction.

The present invention embodiment provides means for directing beams of light from a source thereof upon photoelectric cells and means controlled by air speed indicating means of an aircraft for controlling the intensity of said beams of light in accordance with the air speed of said aircraft. Further means, controlled by the true compass bearing of the flight path, is arranged to modulate said beams of light according to said flight path true compass bearing whereby means responsive to said cells operate latitude and longitude indicators representing the instant dead reckoning position of the flight.

More specifically, the exemplary embodiment of the present invention provides a lamp which emits illumination of an intensity determined by circuit means controlled by the air speed of an aircraft. This illumination is guided into four collimated beams of light arranged in quadrature along the arc of a circle. A photoelectric cell is positioned opposite to each beam of light and is arranged to detect the amount of light flux contained in the associated beam. A plane shutter is interposed between the cells and the beams of light and is arranged to be rotated within its plane in accordance with the true compass bearing of the flight path. The four beams of light are associated with the North, South, East, and West directions of flight and the shutter is contoured at its rim or edge such that the light flux permitted by the shutter to pass to any cell is proportional to the sine or cosine of the true compass bearing (angle of rotation of the shutter). The light flux affecting the North cell, assuming a flight in the northerly direction in the northern hemisphere, will thus be proportional to the cosine of the true compass bearing and to the air speed and thus to the change of latitude of the flight path. Likewise, the East or West cell will receive light flux proportional to the sine of the true compass bearing and to the air speed and thus to the change of longitude of the flight path provided the well known "secant expansion" function is effective to modify this change of longitude according to the latitude of the flight. An additional shutter is interposed between the East and West cells and the beams of light directed thereupon whereby the light flux affecting same is further modified according to the secant of the latitude angle.

The North and South cells are arranged in circuits which produce periodic current pulses at a frequency which is determined by the total light flux detected by said cells. These pulses are used to drive a step-by-step device (in one direction for North pulses and in the opposite direction for South pulses) which is arranged to show on a cumulative basis the degrees and minutes of latitude, each pulse of current representing a change of one minute.

The latitude step counter is arranged to change the position of the secant shutter according to the latitude angle and thus the East and West cells are affected thereby. These cells, with associated circuits, produce periodic current pulses at a frequency which is determined by the total light flux detected thereby. These pulses drive a step-by-step device (in one direction for East pulses and in the opposite direction for West pulses) which is arranged to show on a cumulative basis the degrees and minutes of longitude, each pulse of current representing a change of one minute.

With the foregoing general description and statement of the invention in mind, a detailed description of the exemplary embodiment will be set forth hereinafter. Such detailed description is recited in view of the drawings which form a part thereof and which may be described briefly as follows:

Fig. 1 shows in the upper left portion thereof the circuits by means of which the lamp L is caused to emit light of an intensity proportional to air speed;

Fig. 1 shows in the lower portion thereof the shutters and photoelectric cell circuits whereby the light from lamp L is resolved into pulses of current indicative of changes in latitude and longitude;

Fig. 1 in the upper right portion and Fig. 2 in the upper left portion show the circuit means and mechanism whereby the compass C of Fig. 2 controls the rotation of one of the shutters of Fig. 1;

Fig. 2, in the lower left portion thereof, shows the stepping devices and indicators controlled thereby for indicating the instant latitude, longitude, and air miles flown; and, Figs. 3 and 4 show schematic representations of the photoelectric cells and shutters with respect to the light source and are referred to for a clear understanding of certain relationships which may not be entirely clear from discussions relating to other figures.

The exemplary embodiment of the present invention represents improvement over similar air position indicating circuits and mechanism such as are shown in Patent 2,434,270 to W. H. T. Holden of January 13, 1948. This patent discloses a system which operates on signals provided by an air mileage unit and a fluxgate, or magnesyn remote indicating compass. The air mileage unit delivers to a shaft, in a well-known manner, a rate of rotation proportional to true air speed. The air speed shaft of this unit drives a direct-current generator which functions to convert the air speed into a voltage and also to resolve this voltage into components $E_0 \sin C_N$ and $E_0 \cos C_N$, where $E_0$ is a voltage proportional to true air speed and $C_N$ is the true compass heading as determined by the fluxgate or magnesyn. These voltages are integrated to determine the change in latitude and longitude through the medium of a motor generator set for each component. In this manner each of the latitude and longitude indicators, or counters, through the media of impulse responsive stepping devices, is controlled from its own motor generator set, which sets, in turn, respond to the signals provided by the air mileage unit and the fluxgate or magnesyn in a manner fully described in the said patent. The air mileage counter is controlled directly from the air miles motor unit by means of a stepping mechanism.

The present invention avoids the use of high rotational speeds and the resulting large gear drums by using control shutters which may be sufficiently light in weight such that they can be operated directly by low torque servo-mechanisms.

The air speed circuit

In the upper left portion of Fig. 1 the "Air mileage motor unit," indicated by the box so labeled and identified as reference numeral 64, represents that mechanism of an aircraft which rotates a shaft at a rate proportional to air speed. Through the agency of the gear box 65, cam 61, and contact spring 62 ground is applied to and removed from conductor 63 once for each nautical mile of air flight. These pulses of ground potential are applied over conductor 63 to battery through the winding of stepping magnet 64' of Fig. 2 thereby, in a well-known manner, to step the air mileage counter AMC one mile for each operation of contact 62. The counter AMC shows, as illustrated, an accumulated mileage of 4367 air miles at the instant of the start of the flight under consideration. Suitable known means, to be mentioned further hereinafter, may be utilized to set the counter AMC to any desired mileage, such as 0000, at any time.

The motor unit 64 also turns a tachometer generator TG, the direct-current voltage output of which is proportional to air speed. This output is adjustable as input to the grid of the left section of the dual-triode amplifier tube T by means of the mileage potentiometer MP. It will be observed that the input to the left section of tube T is a positive direct-current voltage, the amplitude of which will vary according to the air speed.

Relay 53, as will be observed from the drawing, is provided with two windings, each of which is in the anode circuit of one of the sections of tube T. These windings are arranged such that with equal currents in both windings relay 53 will retain its armature as shown out of contact with both contacts 1 and 2. When the current in the left winding exceeds the current in the right winding, relay 53 will operate its armature to one of the contacts, say contact 1 thereof, to complete a circuit for causing motor 67 to turn the wiper of potentiometer LP clockwise thereby to increase the illumination emitted by lamp L. When the current in the right winding exceeds the current in the left winding, relay 53 will cause its armature to make contact with its contact 2 to complete a circuit for causing motor 67 to turn the wiper of potentiometer LP counter-clockwise, thereby to decrease the light from lamp L. The circuits for motor 67 extend from ground and battery, to the left terminal of motor 67, through the armature of motor 67, right terminal of motor 67, through either of field coils 59 or 60, over either contact 2 or 1 of relay 53, to ground over the armature of relay 53. When field coil 59 is in circuit, motor 67 will rotate counter-clockwise and when field coil 60 is in circuit, motor 67 will rotate clockwise.

In order that motor 67 be permitted to rotate the wiper of potentiometer LP to a position where lamp L will emit light of an intensity proportional to air speed it is necessary to provide feedback from the lamp L such that relay 53 will revert to its normal position (as shown) in order to stop the rotation of motor 67 at the desired position. This feedback is through the agency of photoelectric cell P5 upon which the lens 58 directs the light from lamp L. The anode of cell P5 is connected to positive battery and the cathode of cell P5 is connected in series through condenser 51 and load resistance 55 to ground. Since the current through cell P5 (caused by illumination from lamp L) is independent of supply voltage, the cell P5 comprises a constant current charging source for condenser 51 (the amount of current proportional to light flux) and will charge condenser 51 positively on its right electrode at a rate determined by the intensity of the light. The gas tube 50 is normally extinguished and condenser 52 in its anode circuit is normally charged to positive anode supply voltage through the anode resistance 54. As soon as condenser 51 acquires a charge sufficient to break down the starting gap of tube 50 a discharge will occur therein which will discharge condenser 51 across the start electrode gap and which will discharge condenser 52 through the main anode gap and load resistance 55. The resistance 54 is of a sufficiently high value such that tube 50 cannot sustain this discharge due to the small current permitted to flow from the anode supply through resistance 54. Tube 50 will thus cause a surge of current through the load resistance 55 as condenser 52 is discharged, whereupon tube 50 will become extinguished and condensers 52 and 51 can again acquire charges as above described. The relative time constants of the respective charging circuits are arranged such that condenser 52 reacquires its charge prior to condenser 51 reacquiring its firing charge. Condenser 51 will repeat the above process at a frequency which is proportional to the intensity of light falling upon cell P5. Thus the voltage applied to the grid of the right section of tube T, after having been smoothed out by the filter comprising resistances 57 and condensers 56, will be substantially a direct-current positive voltage which is proportional to the illumination from lamp L. If this voltage is sufficient to cause an excess of current in the right winding of relay 53, the relay 53 will connect its grounded armature to contact 2 thereby causing motor 67 to reduce the light from lamp L and thus to reduce the feedback voltage. If the voltage is insufficient to overcome or balance the current in the left winding of relay 53, the relay 53 will connect its grounded armature to contact 1 thereby causing motor 67 to increase the light from lamp L and thus increase the feedback voltage. A balance will occur where there is equal current in both windings, whereupon relay 53 will assume its normal condition and motor 67 will stop moving and lamp L will emit a light intensity proportional to air speed.

The compass circuit

The servo-motor SM of Fig. 1 is of the direct current reversible split field series-connected type and is controlled by the three-positioned differential relay 69 in a manner similar to the control of motor 67 by relay 53, previously described. The armature of relay 69 may be operated into engagement with either its contact 1 or its contact 2 to establish a circuit through one or the other of the field windings of the motor SM to cause the motor to run in one or the other direction under the control of the amplifier and phase detector 88 and thus under the control of the output of the synchro-transformer ST2.

For controlling the amplifier and phase sensitive detector circuit 88 and the servo-motor SM, the output windings of the fluxgate primary transmitter FPT of Fig. 2 are connected over conductors 74, 75 and 76 with the stator windings of the differential generator DG, the Y-connected rotor windings of which are connected over conductors 77, 78 and 79 with the corresponding stator windings of the synchro-transformer ST2. The rotor winding R2 of the synchro-transformer ST2 is connected to the input circuit of the amplifier and phase detector 88 and is rotatable through the gears 83, 84 and 85 and through the deviation cam 89 by the servo-motor SM. The rotor of the differential generator DG is rotatable by the setting knob 70 through the gearing 72 to introduce a magnetic correction for the compass. The primary windings of the fluxgate transmitter FRT are energized in series from a source 73 of alternating current in an obvious circuit.

In order that the pilot may have an indication of the true course which he is flying, a compass indicator C of Fig. 2 is installed as part of the instrument panel along with the latitude counter LC, longitude counter LoC, and air mileage counter AMC. The compass pointer 86 is mounted on the shaft of the rotor R1 of the synchro-receiver SR1, the stator windings of which are connected over conductors 80, 81 and 82 with the corresponding stator windings of the secondary transmitting generator STG. The rotor R3 of the generator STG is rotatable through the gears 83 and 84 by the servo-motor SM and the windings of the rotors R1 and R3 are interconnected by conductors 28 and 29 and energized by the source (Fig. 1) of 400-cycle current of the aircraft. The rotation of the rotor winding R3 of the generator STG by the servo-motor SM is thus instrumental in rotating the compass pointer 86, with the magnetic correction introduced by the differential generator DG under the control of the setting knob 70 and the correction made by the deviation cam 89. When the rotor of the differential generator DG is turned by the knob 70, the correction pointer 87 is simultaneously oriented through gearing 71.

With the differential generator DG interposed between the fluxgate generator FPT and the synchro-transformer ST2, the rotor R2 of the transformer ST2 will, through the servo-motor SM and amplifier and phase detector 88, follow the primary transmitting generator FPT but its position will differ by the magnetic correction angle introduced by the setting of the rotor winding of the differential generator DG as indicated by the correction pointer 37.

The servo-motor SM will not be energized when relay 69 is normal as shown. Relay 69 is normal when the outputs from the amplifier and phase detector 88 over the two leads supplying the two windings of relay 69 are equal. This condition is represented by a zero input to the amplifier and phase detector 88 from the winding of rotor R2. The stator windings of the transformer ST2 are supplied by voltages whose relative magnitudes and polarities compared to that of the source 73 (Fig. 2) is a function of the magnetic bearing derived from the fluxgate transformer FPT and of the correction angle determined by the setting of the rotor of the differential generator DG by means of knob 70. This voltage is transferred to the amplifier and phase detector 88 thereby to actuate relay 69 to one side or the other depending upon the phase of said voltage. The operation of relay 69 causes the servo-motor SM to rotate in a direction such that the rotor R2 of transformer ST2 will be turned by the servo-motor through the agency of gear box 68, gears 83, 84 and 85 and the deviation cam 89 in a direction tending to reduce the amplitude of input voltage to the amplifier and phase detector 88. This feedback arrangement continues until rotor R2 (and thus the shaft 107 of the servo-motor SM) has assumed a position where the voltage input to the amplifier and phase detector 88 is again zero. This position of the shaft 107 of servo-motor SM represents the true compass bearing. The change in the rotary position of rotor R3 of the generator STG will be manifested in a corresponding change of rotary position of the rotor R1 of the receiver SR1, thereby to be manifested in a change in the position of the true compass bearing pointer 86 of the compass C.

All of this compass control arrangement is based upon the action of the fluxgate transmitter FPT which, under conditions where no earth's magnetic field (horizontal component) is present to affect the transmitter, would provide no output voltage to the rotor R2 of the transformer ST2, but which transmitter, due to the presence of such a field, causes output voltage having a relative magnitude and polarity with reference to the source 73, at double the frequency of source 73, which is a measure of the angle at which the earth's field intercepts the windings of the transmitter FPT. It will be noted that the amplifier and phase detector 88 is supplied over conductors 90 and 91 by alternating current supplied by a frequency doubler 92 which is energized from the source 73. Frequency doubler 92 is shown as a box since any known such circuit or mechanism may be used in the present circuit. This double frequency is supplied in this manner to the amplifier and phase detector 88 such that the latter may determine positive or negative polarity (zero or 180° phase displacement) of the voltages supplied to it, with reference to the source 73, from the fluxgate transmitter FPT as modified by the differential generator DG.

The instrument stepping arrangements

In Fig. 2 is shown a latitude counter LC which is arranged to count degrees and minutes of latitude change under the control of stepping magnets 16 and 26. Conductors 15 and 25 are controlled from respective North and South direction circuits (to be described hereinafter) such that for each minute of latitude change in the North direction conductor 15 is grounded and ungrounded, and for each minute of latitude change in the South direction conductor 25 is likewise affected. Each such pulse energization of conductor 15, with the hemisphere key K1 normal as shown for a flight in the Northern hemisphere, will actuate magnet 16 thereby to step the counter LC one additional minute under the control of stepping device STP1 and gearing 17. Each pulse energization of conductor 25, likewise, will actuate magnet 26 thereby to step the counter LC in the opposite direction to subtract one minute under the control of stepping device STP1 and gearing 17. For a flight in the Southern hemisphere, key K1 will be actuated thereby reversing the effects of conductors 15 and 25 upon the counter LC.

A longitude counter LoC is arranged to count degrees and minutes of longitude change similarly to the action of the latitude counter LC, above described. Key K2 is normal as shown for flights East of the reference meridian and is actuated for flights in the Western hemisphere. As shown, conductor 35 controls magnet 36 which in turn, through the agency of stepping device STP2 and gearing 37, steps the counter LoC one additional minute for each ground pulse on said conductor. Conductor 45, likewise, subtracts a minute for each pulse.

Each of the counters LC and LoC, as well as the air mileage counter AMC if desired, may be provided with a reset knob such as 19 or 38, which, through the agency of gearing 27 and 39, are arranged to permit manual adjustment of any desired initial setting of these indicators. It will be observed that contacts associated with these knobs immobilize the respective stepping magnets until manual adjustment has been made.

It is to be noticed that the rotor R4 of the latitude transmitting autosyn LTA is mechanically controlled by gear box 18 according to the latitude and is electrically connected over conductors 28 and 29 to the 400-cycle supply. The rotor R5 of the latitude receiving autosyn LRA of Fig. 1 is connected electrically to the rotor R4 and to the 400-cycle supply over conductors 28 and 29. The stator windings of these autosyns are interconnected with one another over conductors 47, 48 and 49. Thus the rotor R5 will follow all angular changes which rotor R4 undergoes. By this means, the shaft 102 of the secant shutter 101 (to be more fully described hereinafter) is rotated to an angular position according to the latitude of the flight position.

The light resolving apparatus

The light from lamp L is divided into four collimated beams each directed through a rectangular slit 103, 104, 105, or 106 in a suitable opaque shield 109. A photoelectric cell is provided opposite each slit on the opposite side of shield 109 from the light source L. These cells are cells P1, P2, P3, and P4 for respective slits 103, 104, 105 and 106.

A plane shutter 100 is mounted upon and rotatable in its own plane by the shaft 107 (schematically indicated by a dash line), the angle of rotation of which is a measure of the true compass bearing of the instant flight path. The rim 108 of shutter 100 is so contoured that the total light flux which affects the cells P1 and P2, representing respectively the North and South components of flight, will vary according to the cosine of the true compass bearing (the angle of rotation of shaft 107). Similarly, with respect only to the shutter 100, the total light flux which affects the cells P3 and P4, representing respectively the East and West components of flight, will vary according to the sine of the true compass bearing. In Fig. 1 the shutter 100 is shown in a position which indicates a flight in the true North direction only, thereby permitting the North cell P1 full light flux (cosine of zero degrees is unity) and permitting the South, East and West cells P2, P3, and P4 no light flux indicating no flight component in these directions.

The light flux detected by the North or South cell P1 or P2, when modified by the cosine of the true compass bearing, is directly proportional to the change of latitude. However, the light flux detected by the East or West cell P3 or P4, when modified by the sine of the true compass bearing, is not a true indication of the latitude change because it must further be modified by the secant of the latitude angle as is well known. (Details of such geometric conclusions are fully set forth in the Holden Patent 2,434,270, above referred to.)

An additional shutter 101 is provided for accomplishing the so-called "secant expansion." This shutter 101, as more clearly indicated in Figs. 3 and 4, may be circularly cylindrical, having two longitudinal slits such as 110 which may correspond in length and width with the slits 105 and 106 in the shield 109. This shutter 101 is rotated according to the latitude through the agency of shaft 102, autosyn LRA, autosyn LTA, and the latitude stepping device STP1, as has been explained. The position of shutter 101 as shown in Fig. 4 represents the maximum amount of secant expansion which is required, that being in a practical case about 80 degrees North or South latitude. The position of shutter 101 as shown in Fig. 3 represents the minimum amount of secant expansion which is required, that being zero at zero latitude (on the equator). The size and nature of the slits 110 in shutter 101 should be such that the rotation of shutter 101 according to the latitude of the flight will modify the light flux, which shutter 100 permits to affect cells P3 and P4, by a factor proportional to the secant of the angle of rotation.

By virtue of these optical arrangements it will be obvious at this point that the total light flux which is detected by the North cell P1 or by the South cell P2 is a measure of the latitude increment of the flight and that the total light flux which is detected by the East cell P3 or by the West cell P4 is a measure of the longitude increment of the flight.

The light integrating arrangement

The light flux which affects a cell, such as the North cell P1, is integrated into a series of direct-current pulses which occur at a frequency proportional to the total light flux. In this manner the stepping devices, such as the latitude stepping device STP1, may be stepped a number of times in a given period of time which will represent the true change of latitude during that time period.

Taking the North cell P1 and associated integrating circuit as an example, it is to be noted that the cell P1 is substantially a constant current source, at constant illumination, independent of the interelectrode voltage. Condenser 11 is originally discharged but when cell P1 detects light the condenser 11 begins to acquire a positive charge on its upper plate at a rate which is proportional to the photoelectric current and thus to the total light flux detected by cell P1. Gas tube 10 is normally extinguished and thus condenser 12 normally is charged to a positive battery potential in a circuit extending from positive battery, through resistance 14 and condenser 12 to ground. As soon as the positive potential on the upper plate of condenser 11 reaches the firing potential of the starter gap of gas tube 10, (and this time is inversely proportional to the total light flux detected by cell P1) tube 10 will fire thereby causing a surge of current to flow through relay 13 and through tube 10 to ground due to the rapid discharge of condenser 12 through the relatively low resistances of relay 13 and tube 10. Relay 13 will operate but will release almost immediately because resistance 14 is of high enough value to reduce the current through tube 10 below the value necessary to sustain the discharge. Relay 13, upon operating, discharges condenser 11 in an obvious circuit over its left contacts. Thus when tube 10 fires and relay 13 operates momentarily, tube 10 is extinguished and condensers 11 and 12 are discharged. Furthermore, condenser 12 must reacquire a charge sufficient to operate relay 13 before the fastest refiring time of tube 10 due to the next charging of condenser 11. The cycle repeats as long as light flux is detected by cell P1. The net result of these operations is that relay 13, by means of its right contacts, grounds conductor 15 momentarily at a recurrence frequency which is proportional to the total light flux detected by cell P1. These pulses on conductor 15, as has been explained, will advance the latitude counter LC one step for each minute of increasing latitude in the Northern hemisphere.

By similar circuits the South cell P2 will cause pulsing on the conductor 25 to step the latitude counter LC in the opposite direction one step for each minute of decreasing latitude in the Northern hemisphere. The operation of the longitude counter LoC through the action of the East and West cells P3 and P4 will be apparent since it is similar to the action of the North-South circuits.

It is to be understood that the above-described arrangements are merely illustrative of the application of the principles of the invention. Numerous other arrangements may be devised by those skilled in the art without departing from the spirit and scope of the invention.

What is claimed is:

1. A beam of energy, means for detecting the amount of energy in said beam, means for varying the intensity of said beam in accordance with a desired function, means for varying the cross-sectional area of said beam in accordance with another desired function, means controlled by said detecting means for generating a signal recurring at a rate which is a measure of the amount of energy in said beam, and means responsive to said signal in accordance with said functions.

2. A beam of energy, means for detecting the amount of energy in said beam, means for varying the intensity of said beam in accordance with a desired function, means for varying the cross-sectional area of said beam in accordance with other desired functions, means controlled by said detecting means for generating a signal recurring at a rate which is a measure of the amount of energy in said beam, and means responsive to said signal in accordance with said functions.

3. A beam of energy, means for detecting the amount of energy in said beam, means for varying the intensity of said beam in accordance with a first desired function, means for varying the cross-sectional area of said beam in accordance with a second desired function, means for varying the cross-sectional area of said beam in accordance with a third desired function, means controlled by said detecting means for generating a signal recurring at a rate which is a measure of the amount of energy in said beam, and means responsive to said signal in accordance with said functions.

4. A beam of energy, means for detecting the amount of energy in said beam, means for varying the intensity of said beam in accordance with a desired function, a mechanical shutter arrangement for varying the cross-sectional area of said beam in accordance with another desired function, means controlled by said detecting means for generating a signal recurring at a rate which is a measure of the amount of energy in said beam, and means responsive to said signal in accordance with said functions.

5. A beam of energy, means for detecting the amount of energy in said beam, means for varying the intensity of said beam in accordance with a desired function, a mechanical shutter arrangement for varying the cross-sectional area of said beam in accordance with other desired functions, means controlled by said detecting means for generating a signal recurring at a rate which is a measure of the amount of energy in said beam, and means responsive to said signal in accordance with said functions.

6. A beam of energy, means for detecting the amount of energy in said beam, means for varying the intensity of said beam in accordance with a first desired function, a first mechanical shutter for varying the cross-sectional area of said beam in accordance with a second desired function, a second mechanical shutter for varying the cross-sectional area of said beam in accordance with a third desired function, means controlled by said detecting means for generating a signal recurring at a rate which is a measure of the amount of energy in said beam, and means responsive to said signal in accordance with said functions.

7. In combination, means for indicating the latitude and longitude of a moving object, beams of energy, means for detecting the amount of energy in each of said beams, means for varying the intensity of said beams in accordance with the speed of said object, means for varying the cross-sectional areas of said beams in accordance with the compass bearing of said object, and means responsive to said detecting means for operating said indicating means.

8. In combination, means for indicating the latitude and longitude of a moving object, beams of energy, means for detecting the amount of energy in each of said beams, means for varying the intensity of said beams in accordance with the speed of said object, means for varying the cross-sectional area of at least one of said beams in accordance with the cosine function of the compass bearing of said object, means for varying the cross-sectional area of at least one other of said beams in accordance with the sine function of the compass bearing of said object, and means responsive to said detecting means for operating said indicating means.

9. In combination, means for indicating the latitude and longitude of a moving object, beams of energy, means for detecting the amount of energy in each of said beams, means for varying the intensity of said beams in accordance with the speed of said object, means for varying the cross-sectional area of at least one of said beams in accordance with the cosine function of the compass bearing of said object, means for varying the cross-sectional area of at least one other of said beams in accordance with the sine function of the compass bearing of said object and in accordance with the instant latitude of said object, and means responsive to said detecting means for operating said indicating means.

10. In combination, means for indicating the latitude and longitude of a moving object, beams of energy, means for detecting the amount of energy in each of said beams, means for varying the intensity of said beams in accordance with the speed of said object, means for varying the cross-sectional area of at least one of said beams in accordance with the cosine function of the compass bearing of said object, means for varying the cross-sectional area of at least one other of said beams in accordance with the sine function of the compass bearing of said object, means for varying the cross-sectional area of said other beam in accordance with the instant latitude of said object, and means responsive to said detecting means for operating said indicating means.

11. In combination, a latitude indicator for indicating the latitude of a moving object, a longitude indicator for indicating the longitude of said object, two beams of light, a light sensitive device for each beam for detecting the amount of light flux in said beam, means for varying the intensity of each beam in accordance with the speed of said object, means for varying the cross-sectional area of one of said beams in accordance with the cosine function of the compass bearing of said object, means for varying the cross-sectional area of the other beam in accordance with the sine function of the compass bearing of said object, means for varying the cross-sectional area of said other beam in accordance with the instant latitude of said object, and means responsive to said devices for operating said indicators.

12. In combination, a latitude indicator, for indicating the latitude of a moving object, a longitude indicator for indicating the longitude of said object, two beams of light, a light sensitive device for each beam for detecting the amount of light flux in said beam, means for varying the intensity of each beam in accordance with the speed of said object, means for varying the cross-sectional area of one of said beams in accordance with the cosine function of the compass bearing of said object, means for varying the cross-sectional area of the other beam in accordance with the sine function of the compass bearing of said object, means controlled by said latitude indicator for varying the cross-sectional area of said other beam in accordance with the instant latitude of said object, and means responsive to said devices for operating said indicators.

13. In combination, a latitude indicator for indicating the latitude of a moving object, a longitude indicator for indicating the longitude of said object, two beams of light, a light sensitive device for each beam for detecting the amount of light flux in said beam, means for varying the intensity of each beam in accordance with the speed of said object, means for varying the cross-sectional area of one of said beams in accordance with the cosine function of the compass bearing of said object, means for varying the cross-sectional area of the other beam in accordance with the sine function of the compass bearing of said object, means controlled by said latitude indicator for varying the cross-sectional area of said other beam in accordance with the secant of the latitude angle of said object, and means responsive to said devices for operating said indicators.

14. In combination, a latitude indicator for indicating the latitude of a moving object, a longitude indicator for indicating the longitude of said object, two beams of light, a photoelectric cell for each beam for detecting the amount of light flux in said beam, means for varying the intensity of each beam in accordance with the speed of said object, a compass for determining the compass bearing of said object, shutter means controlled by said compass for varying the cross-sectional area of one of said beams in accordance with the cosine function of the compass bearing and for varying the cross-sectional area of the other beam in accordance with the sine function of the compass bearing, shutter means controlled by said latitude indicator for varying the cross-sectional area of said other beam in accordance with the secant function of the latitude angle of said object, and means responsive to said cells for operating said indicators.

15. In combination, a latitude indicator for indicating the latitude of a moving object, a longitude indicator for indicating the longitude of said object, two beams of light, a photoelectric cell for each beam for detecting the amount of light flux in said beam, means for varying the intensity of each beam in accordance with the speed of said object, a compass for determining the compass bearing of said object, a mechanical shutter controlled by said compass for varying the cross-sectional area of one of said beams in accordance with the cosine function of the compass bearing and for varying the cross-sectional area of the other beam in accordance with the sine function of the compass bearing, a second mechanical shutter controlled by said latitude indicator for varying the cross-sectional area of said other beam in accordance with the secant function of the latitude angle of said object, and means responsive to said cells for operating said indicators.

16. In combination, a latitude indicator for indicating the latitude of a moving object, a longitude indicator for indicating the longitude of said object, two beams of light, a photoelectric cell for each beam for detecting the amount of light flux in said beam, means for varying the intensity of each beam in accordance with the speed of said object, a compass for determining the compass bearing of said object, a mechanical shutter controlled by said compass for varying the cross-sectional area of one of said beams in accordance with the cosine function of the compass bearing and for varying the cross-sectional area of the other beam in accordance with the sine function of the compass bearing, a second mechanical shutter controlled by said latitude indicator for varying the cross-sectional area of said other beam in accordance with the secant function of the latitude angle of said object, pulse generating means responsive to said cells for generating pulses which recur at a frequency proportional to the amount of light flux detected by said cells, and means for operating said indicators in accordance with said pulses.

17. In combination, a latitude indicator for indicating the latitude of a moving object, a longitude indicator for indicating the longitude of said object, two beams of light, a photoelectric cell for each beam for detecting the amount of light flux in said beam, means for varying the intensity of each beam in accordance with the speed of said object, a compass for determining the compass bearing of said object, a mechanical shutter controlled by said compass for varying the cross-sectional area of one of said beams in accordance with the cosine function of the compass bearing and for varying the cross-sectional area of the other beam in accordance with the sine function of the compass bearing, a second mechanical shutter controlled by said latitude indicator for varying the cross-sectional area of said other beam in accordance with the secant function of the latitude angle of said object, a pulse generator for each cell responsive thereto for generating pulses which recur at a frequency proportional to the amount of light flux detected by said cell, and means for operating each indicator in accordance with the pulses generated by the associated generator.

18. In combination, a latitude indicator for indicating the latitude of a moving object, a longitude indicator for indicating the longitude of said object, two beams of light, a photoelectric cell for each beam for detecting the amount of light flux in said beam, means for varying the intensity of each beam in accordance with the speed of said object, a compass for determining the compass bearing of said object, a mechanical shutter controlled by said compass for varying the cross-sectional area of one of said beams in accordance with the cosine function of the compass bearing and for varying the cross-sectional area of the other beam in accordance with the sine function of the compass bearing, a second mechanical shutter controlled by said latitude indicator for varying the cross-sectional area of said other beam in accordance with the secant function of the latitude angle of said object, a pulse generator for each cell responsive thereto for generating pulses which recur at a frequency proportional to the amount of light flux detected by said cell, and a pulse actuated step-by-step device for operating each indicator in accordance with the pulses generated by the associated generator.

19. In combination, a latitude indicator for indicating the latitude of a moving object, a longitude indicator for indicating the longitude of said object, two beams of light, a photoelectric cell for each beam for detecting the amount of light flux in said beam, means for varying the intensity of each beam in accordance with the speed of said object, a compass for determining the compass bearing of said object, a mechanical shutter controlled by said compass for varying the cross-sectional area of one of said beams in accordance with the cosine function of the compass bearing and for varying the cross-sectional area of the other beam in accordance with the sine function of the compass bearing, a second mechanical shutter controlled by said latitude indicator for varying the cross-sectional area of said other beam in accordance with the secant function of the latitude angle of said object, an electron discharge device for each cell, means controlled by each cell for causing the associated discharge device to ionize and to deionize at a rate proportional to the amount of light flux detected by said cell, and means responsive to the ionizing and deionizing of each discharge device for operating the associated indicator in accordance with the said rate thereof.

20. In combination, a latitude indicator for indicating the latitude of a moving object, a longitude indicator for indicating the longitude of said object, two beams of light, a photoelectric cell for each beam for detecting the amount of light flux in said beam, means for varying the intensity of each beam in accordance with the speed of said object, a compass for determining the compass bearing of said object, a mechanical shutter controlled by said compass for varying the cross-sectional area of one of said beams in accordance with the cosine function of the compass bearing and for varying the cross-sectional area of the other beam in accordance with the sine function of the compass bearing, a second mechanical shutter controlled by said latitude indicator for varying the cross-sectional area of said other beam in accordance with the secant function of the latitude angle of said object, a gaseous discharge tube for each cell, means controlled by each cell for causing the associated tube to be fired and to be extinguished at a rate proportional to the amount of light flux detected by said cell, a relay for each tube responsive thereto for generating pulses which recur at the said rate, and a pulse actuated step-by-step device controlled by each relay for operating each indicator in accordance with the associated pulses.

21. The invention as claimed in claim 20 wherein the means controlled by each cell for controlling the associated tube includes a condenser which is repeatedly charged and discharged at a rate proportional to the amount of current in the associated cell which current is a measure of the amount of light flux detected by said cell and which condenser is arranged to control the firing of the associated gaseous tube at that rate.

References Cited in the file of this patent

UNITED STATES PATENTS

| Number | Name | Date |
|---|---|---|
| 2,060,778 | Finch | Nov. 10, 1936 |
| 2,070,178 | Pottenger, Jr., et al. | Feb. 9, 1937 |
| 2,080,511 | Sjostrand | May 18, 1937 |
| 2,139,295 | Woodling | Dec. 6, 1938 |
| 2,203,882 | Shore | June 11, 1940 |
| 2,398,904 | Libman et al. | Apr. 23, 1946 |
| 2,403,152 | Roters | July 2, 1946 |
| 2,434,270 | Holden | Jan. 13, 1948 |
| 2,454,503 | Crane | Nov. 23, 1948 |
| 2,462,263 | Haynes | Feb. 22, 1949 |
| 2,476,349 | Beard | July 19, 1949 |
| 2,524,847 | Springer | Oct. 10, 1950 |

FOREIGN PATENTS

| Number | Country | Date |
|---|---|---|
| 935,331 | France | June 16, 1948 |
| 607,397 | Great Britain | Aug. 30, 1948 |

UNITED STATES PATENT OFFICE
CERTIFICATE OF CORRECTION

Patent No. 2,740,583                                April 3, 1956

William H. T. Holden

It is hereby certified that error appears in the above numbered patent requiring correction and that the said Letters Patent should read as corrected below.

Column 3, lines 10 and 11, strike out "fluxgate, or magnesyn remote indicating compass." and insert instead -- remote control earth inductor compass, or remote control magnetic compass, either referred to hereinafter as a compass. --; lines 19 and 27, for "fluxgate or magnesyn", each occurrence, read -- compass --; column 5, lines 7, 20, 46 and 64, and column 6, lines 12 and 31, for "fluxgate", each occurrence, read -- compass --; same column, line 75, and column 7, line 3, for "autosyn", each occurrence, read -- synchro-transformer --; column 7, line 6, for "autosyns" read -- synchro-transformers --; line 58, for autosyn", both occurrence, read -- synchro-transformer --.

Signed and sealed this 20th day of August 1963.

(SEAL)
Attest:

ERNEST W. SWIDER                                DAVID L. LADD

Attesting Officer                                     Commissioner of Patents